Oct. 25, 1960

G. E. SORENSEN 2,957,246

METHOD AND MEANS FOR GAGING EXTRAPLANAR SPACE INTERVALS

Filed Oct. 27, 1954

INVENTOR
George E. Sorensen
BY
ATTORNEY

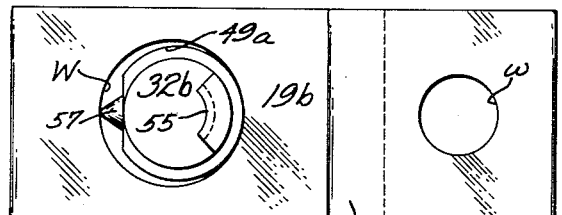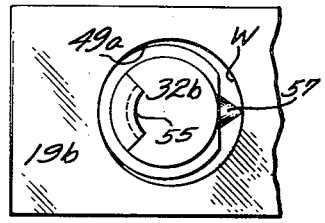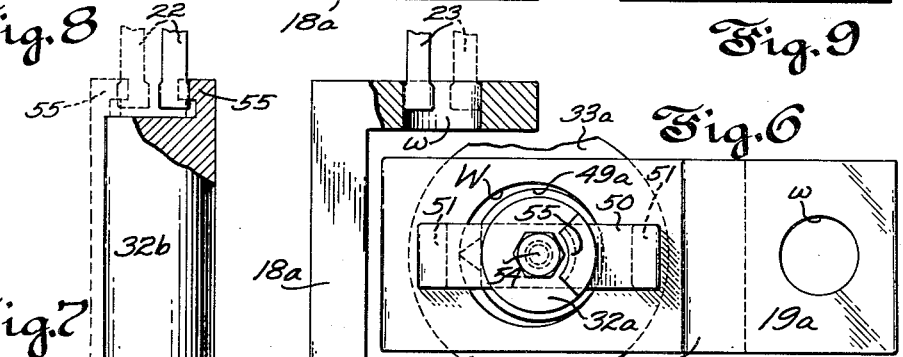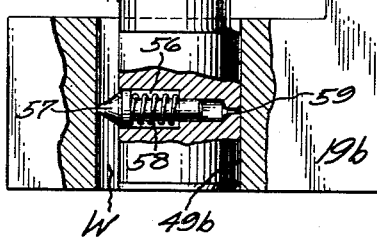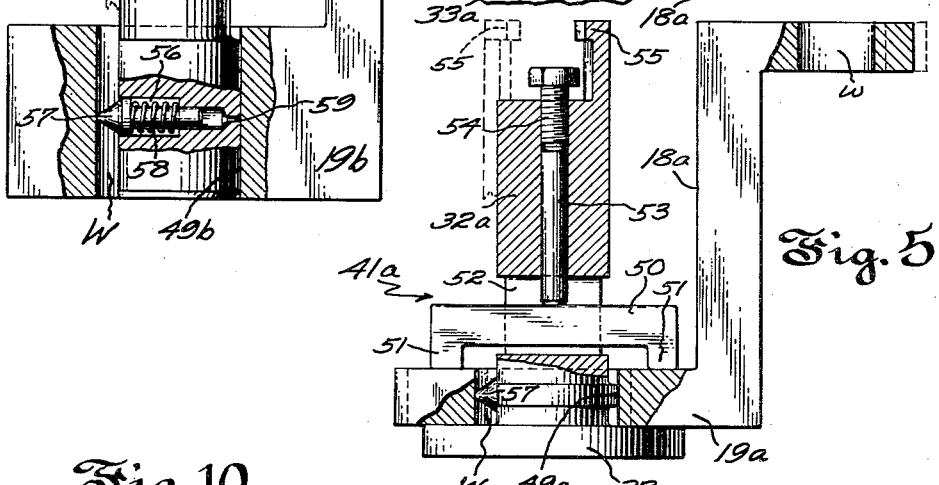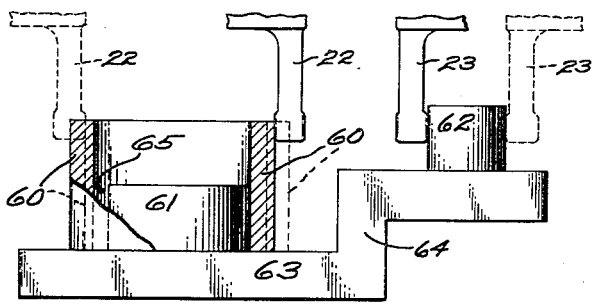
INVENTOR
George E. Sorensen
BY
ATTORNEY

United States Patent Office 2,957,246
Patented Oct. 25, 1960

2,957,246

METHOD AND MEANS FOR GAGING EXTRA-PLANAR SPACE INTERVALS

George E. Sorensen, Fairfield, Conn.
(217 Chipman Drive, Cheshire, Conn.)

Filed Oct. 27, 1954, Ser. No. 465,119

15 Claims. (Cl. 33—143)

In my United States Patent No. 2,677,186 there are disclosed ways and means of determining center distance between two laterally spaced apart holes having parallel axes in a work piece, and without even knowing the sizes of the holes, by performing sequential measuring steps that include calipering a first distance between sides of the holes, stepping off such distance on a specially denominated scale of graduations, calipering a second distance between different sides of the same two holes and additively stepping off on the same scale such second distance, thereby to indicate on the specially denominated scale a graduation which announces the uncalipered distance between the centers of the holes. Such result is made possible by the fact that the graduations on the scale are denominated by indicia reading as half values of the true accumulative measure of the spacings between the graduations.

The holes in the work piece that is disclosed in said patent are positioned in such relation, as to axial extent, that they may be termed "overlapping" in axial direction or coplanar in transaxial relation, meaning that a reference plane normal to the parallel axes of both holes can intersect the axial extents of both holes.

The present improvements relate to ways and means of determining the center distance between holes or studs, or determining some other aspect of their lateral spacing, where the holes or studs have parallel axes but are so disposed in the work piece that their axial extents are staggered, or in no part "overlap" in an axial direction. Such relationship may be termed extraplanar because the axial extents of such holes or studs cannot be intersected by a common reference plane disposed normal to their parallel axes. One instance of such relationship of holes is where a first hole is confined to a body section of a work piece that is entirely offset in the axial direction of the holes from another body section of the same work piece that contains the second hole, as for instance by a jog in the shape of the work piece.

An object of the present improvements is to ascertain by direct reading on the beam calipers of my aforesaid U.S. Patent No. 2,677,186 the center distance between two holes of extraplanar axial extent by calipering simultaneously not the actual sides of both holes, but by calipering a first distance between the actual side of a first hole and the surface of a projector having a predetermined and constant thickness reaching beyond the axial extent of a second hole while its body lies in aligned rectilinear contact with a side of said second hole. Preferably such projector shall be of less breadth than the diameter of the hole thereby to be alignable in contact only sequentially with diametrically opposite sides of the hole occupied by the projector.

In one form of the invention it is disclosed herein that the projector may comprise a hollow body whose internal surface serves as a caliperable surface and whose external surface is placed in rectilinear aligning contact with the side of the hole. In other forms of the invention the external surface of the hollow projector may serve as the caliperable surface and the internal surface may be placed in aligned contact with a stud or post of the work piece.

If posts, studs or similar projections on a work piece are to be measured as to their center distance by the ways and means of these improvements, the aforementioned projector may be a tubular body capable of encompassing the stud with generous clearance therebetween and thus be capable of making linear contact, only sequentially, with the diametrically opposite convex cylindrical surfaces of such post or plug.

A contributory object is to form the aforesaid projector as a mere part section or sector of a completely circular rod or tube having caliperable concentric concave and convex wall surfaces of the same circular curvature as would a complete rod or ring if of full circular extent. Such form of projector is capable of swivelling about in one of the holes that is to be measured, or in respect to the post or stud which it partially encompasses, so that the same point on the wall surface of the projector can occupy different caliperable positions in respect to the work piece.

A still further object of the invention is to incorporate the aforementioned projector in the structure of a work supporting fixture that is shiftably associated with the work piece so that the projector and/or the work piece can be moved relatively to each other as an adjustive step to be performed between the aforesaid two calipering steps of the measuring operations.

These and related objects of the invention will become apparent in greater detail from the following description of preferred embodiments of the invention having reference to the appended drawings wherein:

Fig. 5 shows a modified form of the supporting fixture for the work piece of Figs. 2 and 3 wherein the work piece is clamped to the fixture and the projector swivels in the work hole in relation to the work piece instead of moving from side to side of the hole which it occupies.

Fig. 6 is a plan view looking downward on Fig. 5.

Fig. 7 shows a projector similar to that of Fig. 5 similarly adapted to swivel around in the hole which it occupies but devoid of a work supporting base.

Fig. 8 is a plan view looking downward on Fig. 7.

Fig. 9 shows the projector of Fig. 8 swiveled in the hole which it occupies to be a displacement angle of 180°.

Fig. 10 shows a work piece differing from that in Figs. 1 and 2 by incorporating instead of holes two extraplanar posts or studs whose center distance is to be ascertained with the aid of a modified form of projector.

Figure 1:
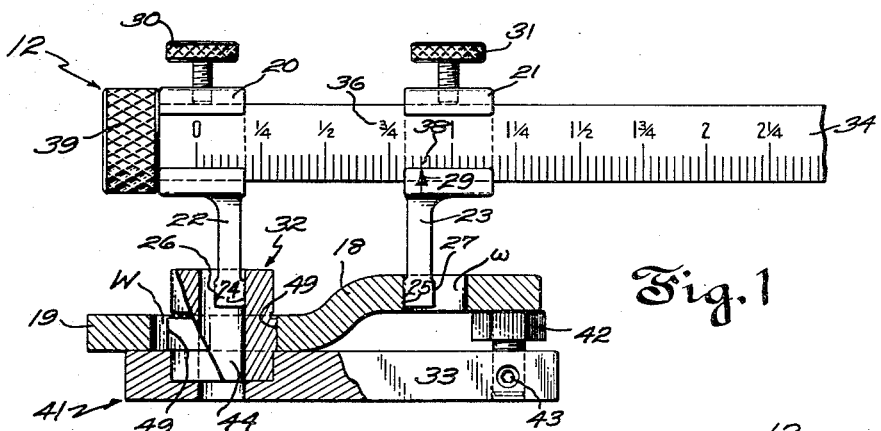
Fig. 1 shows a beam calipers like that of my U.S. Patent No. 2,677,186 applied to a work piece loosely resting on a work supporting fixture incorporating in one form the projector of these improvements.
Figure 2:
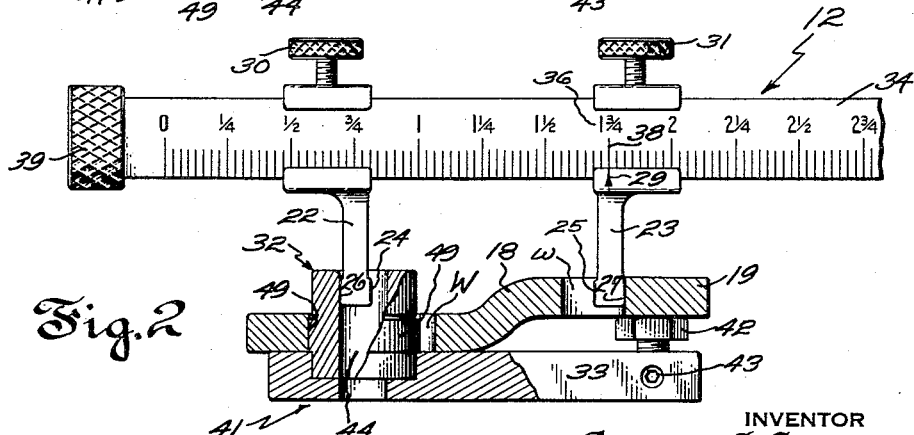
Fig. 2 shows a different relationship of the beam calipers to the work piece and a different relationship of the work piece to its supporting fixture at a subsequent step in the calipering operation.

In Figs. 1 and 2 the beam calipers 12, as in my U.S. Patent No. 2,677,186, comprises movable jaws 20, 21, carrying legs 22, 23, respectively, and slidable on the scale beam 34, but alone incapable of directly calipering the sides of holes W, w in a work piece 19 by being successfully placed in abutting contact because the holes are positioned to be extraplanar in axial extent due to the jog 18 in the work piece.

Figure 3:
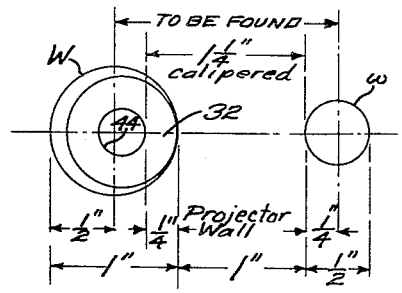
Fig. 3 is a diagram showing dimensions involved in the relationship of parts appearing in Fig. 1.
Figure 4:
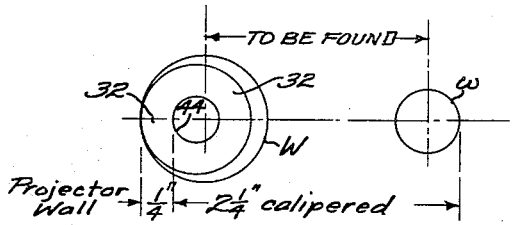
Fig. 4 is a corresponding diagram showing dimensions involved in the different positioning of the parts appearing in Fig. 2.

A comparison of the special problems solved by this invention in use of the calipering instrument proposed in my aforesaid patent can best be made by considering the diagrams of Figs. 3 and 4 hereof in conjunction with the diagrams of Figs. 12 and 13 of my former patent.

The larger work hole W may be assumed to be 1" in diameter and the smaller hole w ½" in diameter. The center distance between the holes which is to be ascertained by the present method and instrumentalities, as in the disclosure of the patent, is 1¾". According to the present invention there may be embedded in the base plate 33 of a work supporting fixture 41 a projector 32. In Figs. 1 and 2 the projector comprises a hollow spacer post or stud fixedly inserted in the base plate 33 having an upward facing seat on which the work piece 19 having the jog 18 in its body shape is adapted to rest loosely. On a relatively high level at the right end portion of base plate 33 in Figs. 1 and 2 a correspondingly high level portion of the work piece is supported slidably on the head of a leveling means in the form of a bolt 42 that has threaded engagement with base plate 33. This bolt may be locked against turning by means of a set screw 43. The lower end portion of work piece 19 rests loosely directly on base plate 33 and is thus free to shift bodily edgewise in any direction relatively to the base plate 33 while work hole W continues to be occupied by the projector 32 which extends therethrough and projects thereabove.

As an incident of construction, projector 32 contains a central round hole 44 truly concentric with its external cylindrical work-contacting surface 49. The latter to advantage can be made a little larger in diameter than other portions of the length of the projector.

For measuring the work piece 19 by means of the beam calipers 12 with the assistance of fixture 41 and its projector 32 we shall assume as taught in my aforesaid patent that the index 29 on jaw 21 of the beam calipers originally registers with that graduation 38 on the scale that is denominated ¼" by the indicia 36 when jaws 20 and 21 are in mutual contact and jaw 20 abuts against the stop head 39 of the scale beam 34.

There will first be explained by reference to Figs. 1 to 4, inclusive, the use of the projector 32 in performing a calipering operation, otherwise like that portrayed in Figs. 12 to 17 inclusive of the drawings of my aforesaid patent, and thereby ascertaining by direct reading on the scale of graduations 38 the uncalipered distance between the centers of work holes W and w.

In Fig. 1 the work piece 19 loosely rests on the base structure 33 of fixture 41 so as to be shiftable in relation thereto and the projector 32 loosely occupies the work hole W with a diametrical clearance of ⅛" with respect thereto, hole W being 1" in diameter and the projector being ⅞" in diameter at its work contacting surface 49. This clearance appears in Fig. 1 at the left side of the projector. The right side of the projector contacts the right side of hole W. The work sensing terminal 25 of the beam calipers is placed in calipering contact with the left side of hole w and simultaneously the work sensing terminal 24 is placed in calipering contact with the internal surface of the wall of projector 32 that bounds hole 44 in the projector. This hole 44 in the illustrative form of the fixture herein shown is ⅜" in diameter and the tubular wall of the projector has a constant thickness of ¼". If the projector has diametrical clearance in work hole W and hole 44 in the projector is large enough to admit the leg terminal portion 22 of the beam calipers, preferably with clearance, the thickness of the wall of the projector may be any feasible dimension since it cancels out in the ultimate measuring operation as will appear from the following description of the next calipering step. Each leg is ¼" wide.

The setting of the calipers as in Fig. 1 has effected a separating space between caliper jaws 20, 21 of 1¼", which distance is the distance 1" between the nearest together edges of work holes W, w plus the ¼" constant thickness of the wall of the tubular projector. Because, however, of the half-values denoting indicia 36 on scale 38 this separation of the jaws causes index 29 to register with a graduation on the scale denoted ⅞" in Fig. 1, this being the initial registration of the index at ¼" increased by half of the actual 1¼" separating movement of the jaws, or ¼" plus ⅝" which equals ⅞".

At this point the thumb screw 31 in jaw 21 is tightened against the top edge of the scale beam, thereby to make jaw 21 fast to the beam, and jaw 20 is moved from its starting position toward the right until it again abuts against jaw 21. Thumb screw 30 in jaw 20 is now tightened to hold the latter fast to the scale beam and thumb screw 31 is again loosened. This frees jaw 21 for further movement to the right beyond its position in Fig. 1 to its position in Fig. 2.

In Fig. 2 work piece 19 has been shifted on base plate 33 of the fixture so the left side of hole W, instead of the right side of the hole, contacts with projector 32. The work sensing terminal 27 is now placed in calipering contact with the right or diametrically opposite side of work hole w and the work sensing terminal 26 is placed in calipering contact with the inner surface of the wall of projector 32 that bounds the hole 44 therein. This has caused a second separation of jaws 20 and 21 to the extent of 1¾" which distance of separating movement, because of the half-value denominated scale, advances index 29 from the ⅞" graduation on the scale to the 1¾" graduation on the scale, this being a true reading on the scale of the uncalipered distance between the centers of work holes W and w. The second jaw separating movement of 1¾" is composed of the distance 1" between the nearest together sides of the work holes plus the sum of the diameters of both work holes 1" and ½", minus the combined width ½" of both calipering legs 22, 23, minus the wall thickness ¼" of projector 32.

From the foregoing dimensional data it will be seen that in contrast to direct calipering of both work hole sides, as in my aforesaid patent, the wall thickness of the projector has increased by ¼" what otherwise would be the first distance of separation of the jaws 20, 21 in Fig. 1, and has decreased by the same ¼" what otherwise would be the second distance of separation of the jaws in Fig. 2. Thus the projector thickness, whatever it may be, cancels out and does not defeat the ability of the beam calipers to indicate true center distance as a result of calipering steps otherwise like those described in fuller detail in my aforesaid U.S. patent, a discovery not revealed in the disclosure of said patent.

Some of the illustrative dimensions hereinbefore referred to are placed on diagrammatic plan views of the work holes in Figs. 3 and 4 where the projector 32 appears positioned relatively to the work holes as in Figs. 1 and 2, respectively.

In Figs. 5 and 6 there is shown a modified shape of work piece 19a in which the more pronounced jog 18a produces a greater extent of axial offset or extraplanar relationship of the axial extent of work holes W and w than in Figs. 1 and 2 wherefore the projector needs to be a relatively tall post 32a. The base plate 33a in Figs. 5 and 6 affords less support surface on which the work piece can rest and the height leveling bolt 42 of Figs. 1 and 2 is omitted. The work piece 19a is maintained in face to face abutment against the support surface of base plate 33a by leveling means structurally associated with the fixture 41a in a manner to oppose tilting of the work piece in relation to such support surface as a substitute for bolt 42 in Figs. 1 and 2. Such leveling means is herein shown as a work clamping device in the form of a yoke 50 having two pressor feet 51 which bear on the work piece at diametrically opposite sides respectively of projector 32a. Feet 51 are enabled to do this because yoke 50 extends loosely through a transaxial aperture 52 in the projector. Pressor feet 51 are forced downward against the top surface of the work piece by a pressure equalizing centrally located plunger pin 53 that is freely slidable in a vertical hole in the projector. Pin 53 is thrust downward endwise by a set screw 54 having threaded engagement with the upper end portion of the vertical hole in the projector. The head of set screw 54 is made accessible for tightening and loosening it at a height level below that which will be utilized in calipering of the work and thereby clears the way for applying a wrench or other tool to the head of the set screw.

In this form of projector the top portion of the projector post may be cut away to give free access to the head of screw 54 so that all that remains of the solid head section of the post at its top end is only a sectorial, arcuate, upstanding, caliperable wall 55 which may have concentric internal and external cylindrical curvatures corresponding to the inside and outside surfaces of the tubular wall of projector 32 in Figs. 1 to 4, inclusive. The manner of applying the calipering legs 22 and 23 to the projector and work hole w of Figs. 5 and 6 is represented by the abbreviated showing of such legs in Fig. 7. The work contacting surface 49a of projector 32a may be circumferentially incomplete, as is its caliperable wall 55. Where thus circularly incomplete the projector may be provided with a laterally projecting plunger 57 that is slidable laterally of the projector in a bearing socket 56 and backed up by an axially expansive spring coil 58 freely housed in the socket. An air relief vent 59 prevents trapping of air in socket 56. (See Fig. 7.) The outer bluntly pointed end of plunger 57 bears yieldably against the surface of the work piece 19a that bounds hole W and maintains the work contacting surface 49a of the projector in abutment with the diametrically opposite side of work hole W. Thus projector 32a as a whole, and its sectorial caliperable head wall 55, can be swiveled about in work hole W so that such head wall can be swung from its full line to broken line position in Fig. 5 enabling its concave surface nearest the axis of the projector thus to be calipered in either of two different relationships to the work piece instead of by shifting a circumferentially complete tubular projector diametrically back and forth as is done in Figs. 1 and 2. In Figs. 5 to 9, inclusive, the central vertical axis of set screw 54 is eccentric in relation to the central vertical axis of work hole W so that in its swivelling movement in work hole W projector post 32a turns bodily as in an orbit about the axis of the work hole. The outer edges of socket 56 may be peened over to limit the extent of projection of plunger 57 from the socket. The cross sectional shape of post 32a need not be circular but may be square or otherwise contoured.

In Figs. 7, 8 and 9 the plunger 57 and its outward biased mounting in bearing socket 56 are shown in clearer detail and the work supporting base plate 33a can be omitted because the axial extents of work hole W and of the work contacting surfaces 49b of the projector 32b are sufficiently long to maintain dependable true parallelism of the axes of the projector and of the work hole thus to make unnecessary any base plate on which to support the work piece. Thus in effect projector 32b is in the nature of a plug that can be inserted and swiveled about in any sufficiently long, relatively oversize work hole for use in calipering operations using the instrument of my U.S. patent just as hereinbefore described.

Fig. 10 shows a hollow cylindrical projector 60 whose tubular wall is constant in thickness and is shiftable back and forth diametrically between full line and broken line positions in respect to a work stud 61 whose axial extent is in extraplanar relation to the axial extent of another work stud 62. Both of these studs are fixed in and project from a common work piece 63 having the jog 64. The distance between the centers of studs 61 and 62 is ascertained by calipering steps which involve sensing the outside or convex surfaces of the projector and one work stud, rather than by sensing the concave surface of a projector and the concave surface of a work piece bounding a work hole. The diametrical clearance between stud 61 and projector 60 is indicated at 65 in Fig. 10.

In conclusion it may be mentioned that the problems to which these improvements are applied arise from the necessity of calipering parallel work surfaces which bound space intervals by contacting the work surfaces at points contained in a common plane to which both work surfaces are perpendicular, because only in such plane can the minimum distances of separation be accurately ascertained. Having in effect brought extraplanar caliperable work surfaces into such common plane by use of projectors as disclosed herein, the work sensing feelers performing the calipering operations need not, in a broad aspect of the method involved, be in predetermined mechanical association with the scale of graduations but may, like machinist's dividers, be spread to the calipered distances and then laid in register with a mechanically separate scale of graduations of half-value denomination as herein disclosed.

It is obvious that the fixtures 12 and 12a may have many and sundry forms within the principles of their construction and use as disclosed herein and that the sequential steps of the calipering operations may be reversed and otherwise altered within the teaching of my aforesaid U.S. patent wherefore the appended claims are directed to and intended to cover all substitutes and variations which fairly come within the broadest interpretation of their terms.

I claim:

1. The method of ascertaining center distance between two round holes having parallel axes and positioned in a work piece to be in extraplanar relation as to axial extent, which includes the steps of, aligning in contact with a first side of a first one of said two holes the work contacting surface of a projector having a predetermined constant lateral thickness less than the diameter of said first hole and having a caliperable surface displaced from said work contacting surface by said thickness reaching beyond the axial extent of said first hole in a direction parallel with the hole axis and into coplanar relation to the axial extent of the second one of said holes, calipering a first distance between said caliperable surface of said projector and a first side of said second hole, stepping off said first distance on a scale having graduations denominated as half-values of the true accumulative measure of the spacings between said graduations, shifting the lateral relationship of said projector and the work piece so that said projector becomes aligned in contact with a second side of said first hole that is diametrically opposite said first side of said first hole, calipering a second distance between said caliperable surface of said projector and a second side of said second hole that is diametrically opposite said first side of said second hole, and stepping off said second distance on said half-value denominated scale additively to said first distance, whereby to arrive on said scale at a graduation denominated as the true center distance of said holes.

2. The method of ascertaining center distance between two holes having parallel axes and positioned in a work piece to be in extraplanar relation as to axial extent, which includes the steps of, aligning in contact with a first side of a first one of said two holes a projector having a predetermined constant lateral thickness less than the diameter of said first hole and having a caliperable surface reaching beyond the axial extent of said first hole in a direction parallel with the hole axis and into coplanar relation to the axial extent of the second one of said holes, calipering a first distance between a first side of said second hole and said surface of said projector displaced laterally by said thickness of said projector from straight alignment with a first side of said first hole, stepping off said first distance on a scale having graduations denominated as half-values of the true accumulative measure of the spacings between said graduations, shifting the lateral relationship of said projector and the work piece so that said projector becomes aligned in contact with a second side of said first hole that is diametrically opposite said first side of said first hole, calipering a second distance between a second side of said second hole that is diametrically opposite said first side of said second hole and said surface of said projector displaced laterally by said thickness from straight alignment with said second side of said first hole, and stepping off said second distance on said half-value denominated scale additively to said first distance, whereby to arrive on said scale at a graduation denominated as the true center distance of said holes.

3. The method of ascertaining center distance between two holes having parallel axes and positioned in a work piece to be in extraplanar relation as to axial extent, which includes the steps of, placing in solely rectilinear contact with a first side of a first one of said two holes a projector having a predetermined constant thickness less than the diameter of said first hole and having concentric internal and external arcuate surfaces of circular curvature separated radially by said thickness, at least one of said surfaces reaching beyond the axial extent of said first hole in a direction parallel with the hole axis and into coplanar relation to the axial extent of the second one of said holes, calipering a first distance between an internal arcuate surface of said projector and a first side of said second hole, stepping off said first distance on a scale having graduations denominated as half-values of the true accumulative measure of the spacings between said graduations, shifting the lateral relationship of said projector and the work piece so that said projector is in solely rectilinear contact with a second side of said first hole that is diametrically opposite said first side of said first hole, calipering a second distance between an internal arcuate surface of said projector and a second side of said second hole that is diametrically opposite said first side of said second hole, and stepping off said second distance on said half-value denominated scale additively to said first distance, whereby to arrive on said scale at a graduation denominated as the true center distance of said holes.

4. The method of ascertaining center distance between two holes having parallel axes and positioned in a work piece to be in extraplanar relation as to axial extent, which includes the steps of, placing in a first one of said two holes a loose fitting hollow projector having an arcuate wall of predetermined and constant thickness having inner and outer surfaces, at least one of said surfaces reaching beyond the axial extent of said first hole in a direction parallel with the hole axis and into coplanar relation to the axial extent of the second one of said holes, relating said work piece and said projector so that the latter is in contact with a first side of said first hole, calipering a first distance between the inner surface of said wall of said projector and a first side of said second hole, said inner surface being displaced laterally by said predetermined constant thickness from straight alignment with said first side of said first hole, stepping off said first distance on a scale having graduations denominated as half-values of the true accumulative measure of the spacings between said graduations, changing the relationship of said work piece and said projector so that the latter is in contact with a second side of said first hole that is diametrically opposite said first side of said first hole, calipering a second distance between said inner surface of said projector and a second side of said second hole that is diametrically opposite said first side of said second hole, said inner surface being displaced laterally by said constant thickness from straight alignment with said second side of said first hole, and stepping off said second distance on said half-value denominated scale additively to said first distance, whereby to arrive on said scale at a graduation denominated as the true center distance of said holes.

5. The method of ascertaining the distance between centers of two extraplanar space intervals each of which intervals is bounded by two contactable surfaces in a work piece, which includes the steps of, projecting the position of one of said contactable surfaces from a plane in the axial extent of one of said space intervals to a plane in the axial extent of the other of said space intervals by aligning in contact with said one contactable surface a spacer body of predetermined and constant thickness less than the distance between contactable surfaces of said one space interval projecting beyond said one contactable surface in alignment therewith, calipering a first distance from a caliperable surface of said spacer body to one boundary surface of the other of said space intervals equal to the space between said one contactable surface of said one space interval and said one boundary surface of said other space interval altered by said thickness of said spacer body, stepping off said first distance on a scale having graduations denominated as half values of the true accumulative measure of the spacings between said graduations, shifting the relationship of said spacer body and the work piece so that the position of the other contactable surface of said one space interval is projected from a plane of the axial extent of said one space interval to a plane of the axial extent of said other space interval by aligning said spacer body in contact with said other contactable surface and projecting therebeyond in alignment therewith, calipering a second distance from said surface of said spacer body to the other boundary surface of said other space interval equal to the space between said other contactable surface of said one space interval and said other boundary surface of said other space interval altered by said thickness of said spacer body, and stepping off said second distance on said scale additively to said first distance, whereby to arrive on said scale at a graduation denominated as the true center distance of said space intervals.

6. A fixture for use in calipering transaxial distances between spaced holes having parallel axes and extraplanar axial extents in a work piece of offset shape comprising, base structure having support surfaces at relatively different levels on which offset portions of a work piece respectively containing holes having extraplanar ends may simultaneously rest, and a hollow projector of less thickness than the width of one of said holes fixed to and outstanding from one of said support surfaces toward and beyond a plane containing the other of said support surfaces of the base structure, whereby said projector can extend with laterally shiftable clearance through said one of said holes and project out of one end thereof into coplanar relation to the extraplanar end of the other of said holes for enabling transaxial distances between points having a known relation to said holes to be calipered in a common plane normal to said axes.

7. A fixture as defined in claim 6, in which one of the said work support surfaces is mounted on the said base structure in a manner to be adjustably movable toward and away from the level of the other of said support surfaces, wherefore stably to support work pieces having various extents of offset in their body shapes.

8. A fixture for use in calipering transaxial distances between two holes having parallel axes and extraplanar ends opening respectively through extraplanar faces in relatively offset portions of a workpiece, comprising a base presenting a seat on which one face of one of said portions of the work piece may rest at a level of the base, means engageable with another face of the workpiece in a plane of contact perpendicular to the axes of the workpiece holes remote from said base level in a manner to stabilize the work piece in face-to-seat contact with said base at said base level, and a spacer post outstanding from said seat having in one portion of its length a cylindrical periphery near said seat for occupying one of said holes in the work piece and having in an extended portion of its length reaching to a farther extent than said engageable portion of said stabilizing means a cylindrical contour concentric with said periphery, whereby there may be calipered in a choice of common planes parallel with and at the opposite side of said plane of contact from said seat a point on said post and a side of said other hole in a direction perpendicular to the parallel axes of the holes.

9. A fixture as defined in claim 8, in which the said spacer post comprises a tubular body bounded at least in part by the said cylindrical periphery and the said cylindrical contour.

10. A fixture as defined in claim 8 in which the said post has a transaxial aperture extending therethrough, and the said work stabilizing means comprises a work clamping device extending loosely through said post and projecting from each end of said aperture for contact with the work piece thereat.

11. A fixture as defined in claim 10, in which the said post has a centrally disposed hole extending longitudinally therethrough, together with a set screw having threaded engagement with said hole, and a pin slidable in said hole filling the space between said set screw and the said clamping device.

12. A fixture as defined in claim 11, in which the said post has a caliperal head wall of less than 180 degrees circular extent rising to a higher level than the said set screw.

13. In a fixture as defined in claim 12, a laterally yieldable expander mounted in the said spacer post near the said base comprising, a bearing socket in said post opening laterally thereof and a plunger slidably mounted in said bearing socket and projecting laterally therefrom in a direction toward a side of the work piece hole diametrically opposite to the said caliperable head wall of less than 180 degrees circular extent.

14. A fixture as defined in claim 12, together with a laterally acting yieldable expander mounted in the said post near the said base wherefore to occupy a work hole in the work piece and press against the side thereof for taking up play between said work hole and said post.

15. In a fixture as defined in claim 14 an expander as defined in said claim comprising, a bearing socket in said butt end portion of the said spacer post opening laterally thereof, a plunger slidably mounted in said bearing socket and projecting therefrom toward one side of the said work hole, and resilient means constantly and yieldingly urging said plunger endwise toward said side of said hole, wherefore to take up all clearance between said butt end portion and the opposite side of said hole while permitting said plug device to swivel about in said hole.

References Cited in the file of this patent
UNITED STATES PATENTS

| | | |
|---|---|---|
| 2,384,071 | Boyer | Sept. 4, 1945 |
| 2,431,764 | McCann | Dec. 2, 1947 |
| 2,470,458 | Barr | May 17, 1949 |
| 2,539,597 | Staples | Jan. 30, 1951 |
| 2,636,280 | Drake | Apr. 28, 1953 |
| 2,677,186 | Sorensen | May 4, 1954 |
| 2,727,313 | Wonders | Dec. 20, 1955 |

OTHER REFERENCES

The American Machinist (publication), page 439, Sept. 11, 1924. (Copy in Scientific Library, U.S. Patent Office.)

The American Machinist (publication), page 114, June 16, 1949. (Copy in Scientific Library, U.S. Patent Office.)